US008015002B2

(12) United States Patent
Li et al.

(10) Patent No.: US 8,015,002 B2
(45) Date of Patent: Sep. 6, 2011

(54) DYNAMIC NOISE REDUCTION USING LINEAR MODEL FITTING

(75) Inventors: Xueman Li, Burnaby (CA); Rajeev Nongpiur, Burnaby (CA); Phillip A. Hetherington, Port Moody (CA)

(73) Assignee: QNX Software Systems Co., Ottawa, Ontario (CA)

( * ) Notice: Subject to any disclaimer, the term of this patent is extended or adjusted under 35 U.S.C. 154(b) by 986 days.

(21) Appl. No.: 11/923,358

(22) Filed: Oct. 24, 2007

(65) Prior Publication Data

US 2009/0112584 A1 Apr. 30, 2009

(51) Int. Cl.
*G10L 21/02* (2006.01)
*G10L 15/20* (2006.01)

(52) U.S. Cl. ......................... 704/226; 704/227; 704/233

(58) Field of Classification Search .................. 704/226, 704/227, 233, E15.039, E21.002, 4, 14
See application file for complete search history.

(56) References Cited

U.S. PATENT DOCUMENTS 5,978,824 A * 11/1999 Ikeda ............................ 708/322
6,044,068 A 3/2000 El Malki
6,493,338 B1 12/2002 Preston et al.
6,690,681 B1 2/2004 Preston et al.
6,741,874 B1 5/2004 Novorita et al.
6,771,629 B1 8/2004 Preston et al.
7,142,533 B2 11/2006 Ghobrial et al.
7,146,324 B2 * 12/2006 Den Brinker et al. ........ 704/500
7,366,161 B2 4/2008 Mitchell et al.
2001/0006511 A1 7/2001 Matt
2004/0066940 A1 * 4/2004 Amir ............................ 381/94.2
2004/0167777 A1 * 8/2004 Hetherington et al. ........ 704/226
2006/0100868 A1 * 5/2006 Hetherington et al. ........ 704/226
2006/0136203 A1 * 6/2006 Ichikawa ...................... 704/226
2007/0025281 A1 2/2007 McFarland et al.
2007/0058822 A1 * 3/2007 Ozawa ......................... 381/94.1
2007/0185711 A1 * 8/2007 Jang et al. ..................... 704/226
2009/0112579 A1 4/2009 Li et al.

OTHER PUBLICATIONS

Yariv Ephraim et al., "Speech Enhancement Using Minimum Mean-Square Error Short-Time Spectral Amplitude Estimator", IEEE Transactions on Acoustics, Speech, and Signal Processing, vol. ASSP-32, No. 6, Dec. 1984.
Y. Ephraim et al., "Speech Enhancement Using a Minimum Mean-Square Error Log-Spectral Amplitude Estimator", IEEE Transactions on Acoustic, Speech, and Signal Processing, vol. ASSP-33, No. 2, Apr. 1985.
Klaus Linhard et al., "Spectral Noise Subtraction with Recursive Gain Curves", Daimler Benz AG, Research and Technology, Jan. 9, 1998.

* cited by examiner

*Primary Examiner* — Talivaldis Ivars Smits
*Assistant Examiner* — Jesse S Pullias
(74) *Attorney, Agent, or Firm* — Brinks Hofer Gilson & Lione

(57) ABSTRACT

A speech enhancement system improves the speech quality and intelligibility of a speech signal. The system includes a time-to-frequency converter that converts segments of a speech signal into frequency bands. A signal detector measures the signal power of the frequency bands of each speech segment. A background noise estimator measures a background noise detected in the speech signal. A dynamic noise reduction controller dynamically models the background noise in the speech signal. The speech enhancement renders a speech signal perceptually pleasing to a listener by dynamically attenuating a portion of the noise that occurs in a portion of the spectrum of the speech signal.

23 Claims, 17 Drawing Sheets

DYNAMIC NOISE REDUCTION USING LINEAR MODEL FITTING

BACKGROUND OF THE INVENTION

1. Technical Field

This disclosure relates to a speech enhancement, and more particularly to enhancing speech intelligibility and speech quality in high noise conditions.

2. Related Art

Speech enhancement in a vehicle is a challenge. Some systems are susceptible to interference. Interference may come from many sources including engines, fans, road noise, and rain. Reverberation and echo may also interfere in speech enhancement systems, especially in vehicle environments.

Some noise suppression systems attenuate noise equally across many frequencies of a perceptible frequency band. In high noise environments, especially at lower frequencies, when equal amount of noise suppression is applied across the spectrum, a higher level of residual noise may be generated, which may degrade the intelligibility and quality of a desired signal.

Some methods may enhance a second formant frequency at the expense of a first formant. These methods may assume that the second formant frequency contributes more to speech intelligibility than the first formant. Unfortunately, these methods may attenuate large portions of the low frequency band which reduces the clarity of a signal and the quality that a user may expect. There is a need for a system that is sensitive, accurate, has minimal latency, and enhances speech across a perceptible frequency band.

SUMMARY

A speech enhancement system improves the speech quality and intelligibility of a speech signal. The system includes a time-to-frequency converter that converts segments of a speech signal into frequency bands. A signal detector measures the signal power of the frequency bands of each speech segment. A background noise estimator measures a background noise detected in the speech signal. A dynamic noise reduction controller dynamically models the background noise in the speech signal. The speech enhancement renders a speech signal perceptually pleasing to a listener by dynamically attenuating a portion of the noise that occurs in a portion of the spectrum of the speech signal.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Hands-free systems, communication devices, and phones in vehicles or enclosures are susceptible to noise. The spatial, linear, and non-linear properties of noise may suppress or distort speech. A speech enhancement system improves speech quality and intelligibility by dynamically attenuating a background noise that may be heard. A dynamic noise reduction system may provide more attenuation at lower frequencies around a first formant and less attenuation around a second formant. The system may not eliminate the first formant speech signal while enhancing the second formant frequency. This enhancement may improve speech intelligibility in some of the disclosed systems.

Some static noise suppression systems (SNSS) may achieve a desired speech quality and clarity when a background noise is at low or below a medium intensity. When the noise level exceeds a medium level or the noise has some tonal or transient properties, static suppression systems may not adjust to changing noise conditions. In some applications, the static noise suppression systems generate high levels of residual diffused noise, tonal noise, and/or transient noise. These residual noises may degrade the quality and the intelligibility of speech. The residual interference may cause listener fatigue, and may degrade the performance of automatic speech recognition (ASR) systems.

In an additive noise model, the noisy speech may be described by equation 1.

$$y(t)=x(t)+d(t) \tag{1}$$

where x(t) and d(t) denote the speech and the noise signal, respectively. In equation 2, $|Y_{n,k}|$ designate the short-time spectral magnitudes of noisy speech, $|X_{n,k}|$ designates the short-time spectral magnitudes of clean speech, $|D_{n,k}|$ designate the short-time spectral magnitudes noise, and $G_{n,k}$ designates short-time spectral suppression gain at the nth frame and the kth frequency bin. As such, an estimated clean speech spectral magnitude may be described by equation 2.

$$|\hat{X}_{n,k}|=G_{n,k}\cdot|Y_{n,k}| \tag{2}$$

Because some static suppression systems create musical tones in a processed signal, the quality of the processed signal may be degraded. To minimize or mask the musical noise, the suppression gain may be limited as described by equation 3.

$$G_{n,k}=\max(\sigma,G_{n,k}) \tag{3}$$

The parameter σ in equation 3 is a constant noise floor, which establishes the amount of noise attenuation to be applied to each frequency bin. In some applications, for example, when σ is set to about 0.3, the system may attenuate the noise by about 10 dB at frequency bin k.

Noise reduction systems based on the spectral gain may have good performance under normal noise conditions. When low frequency background noise conditions are excessive, such systems may suffer from the high levels of residual noise that remains in the processed signal.

Figure 1:
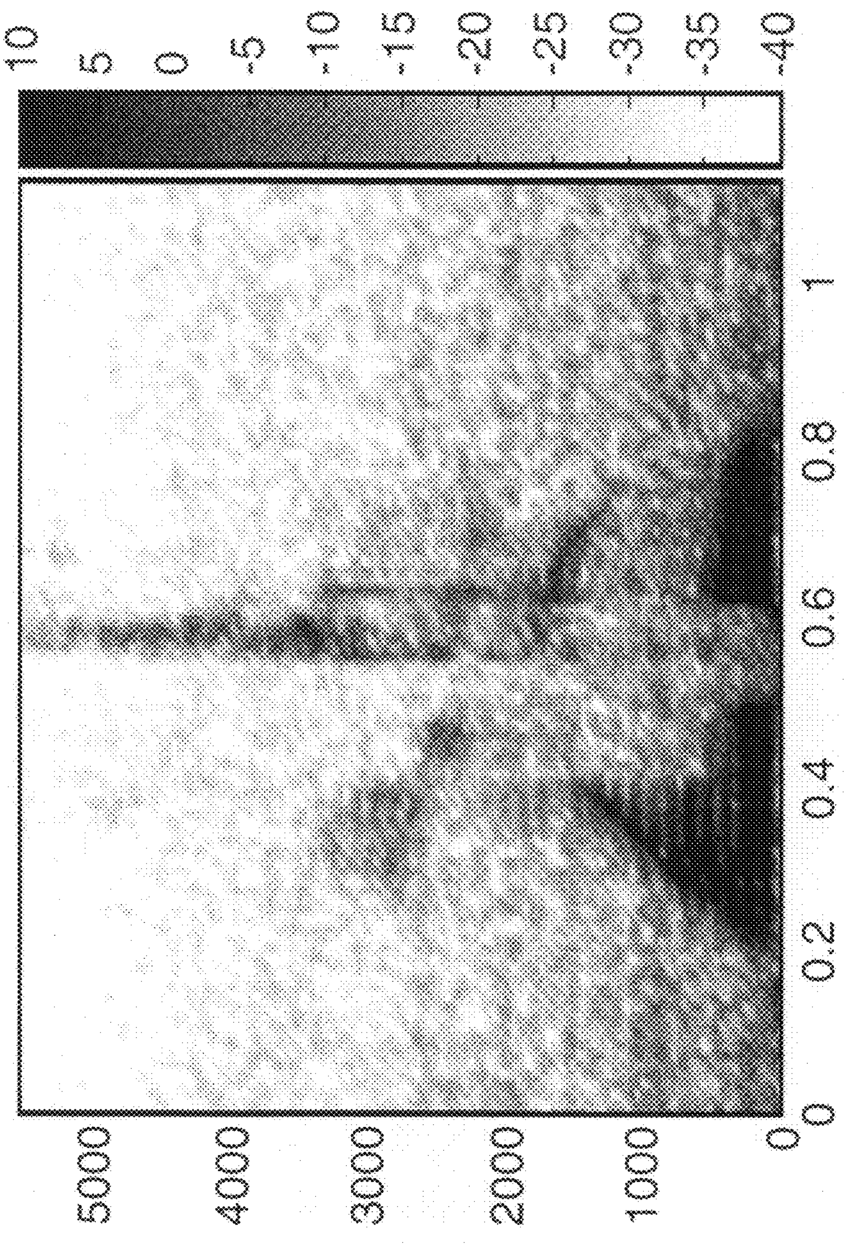
FIG. 1 is a spectrogram of a speech signal and a vehicle noise of medium intensity.
Figure 2:
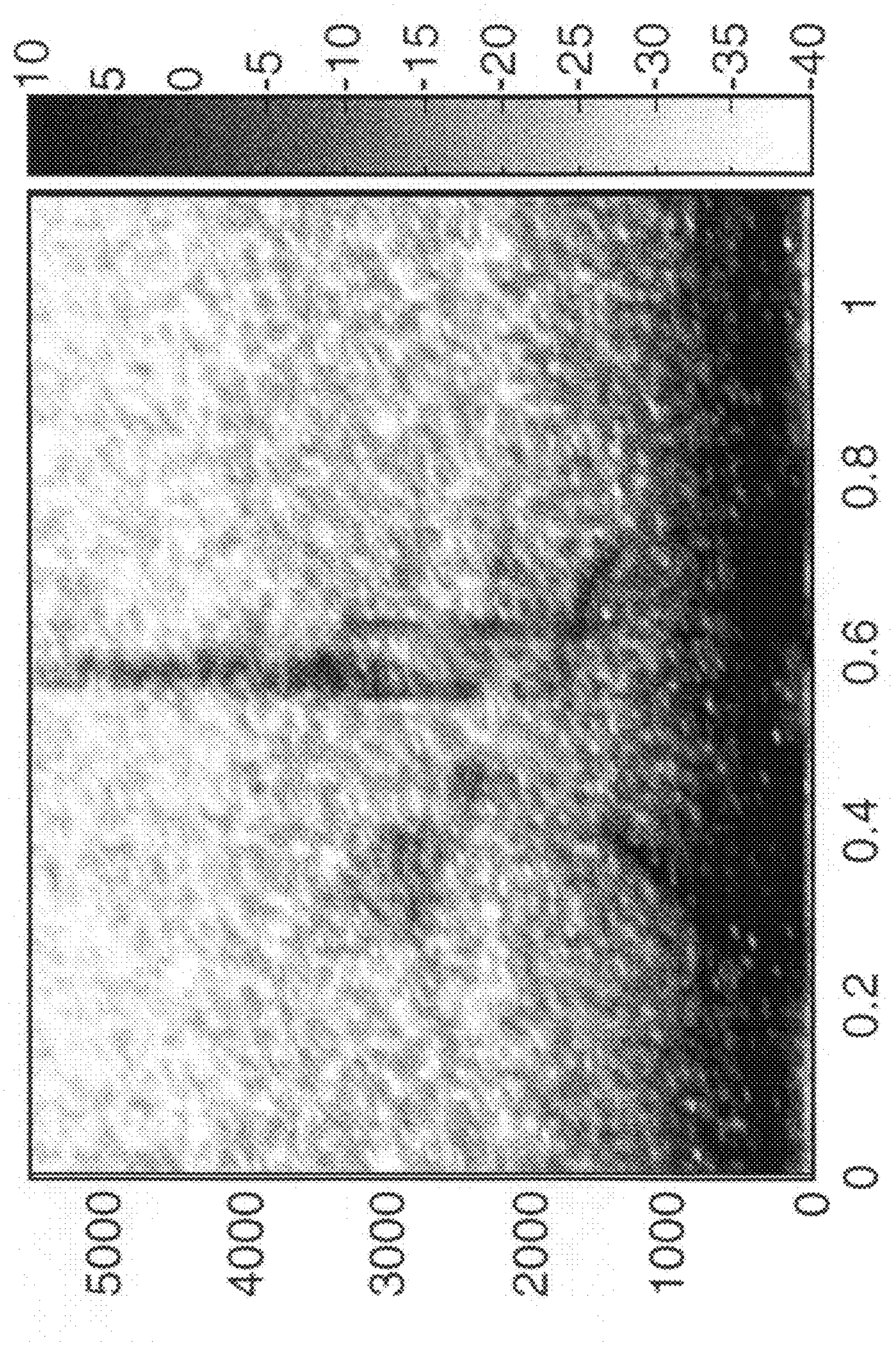
FIG. 2 is a spectrogram of a speech signal and a vehicle noise of high intensity.
Figure 3:
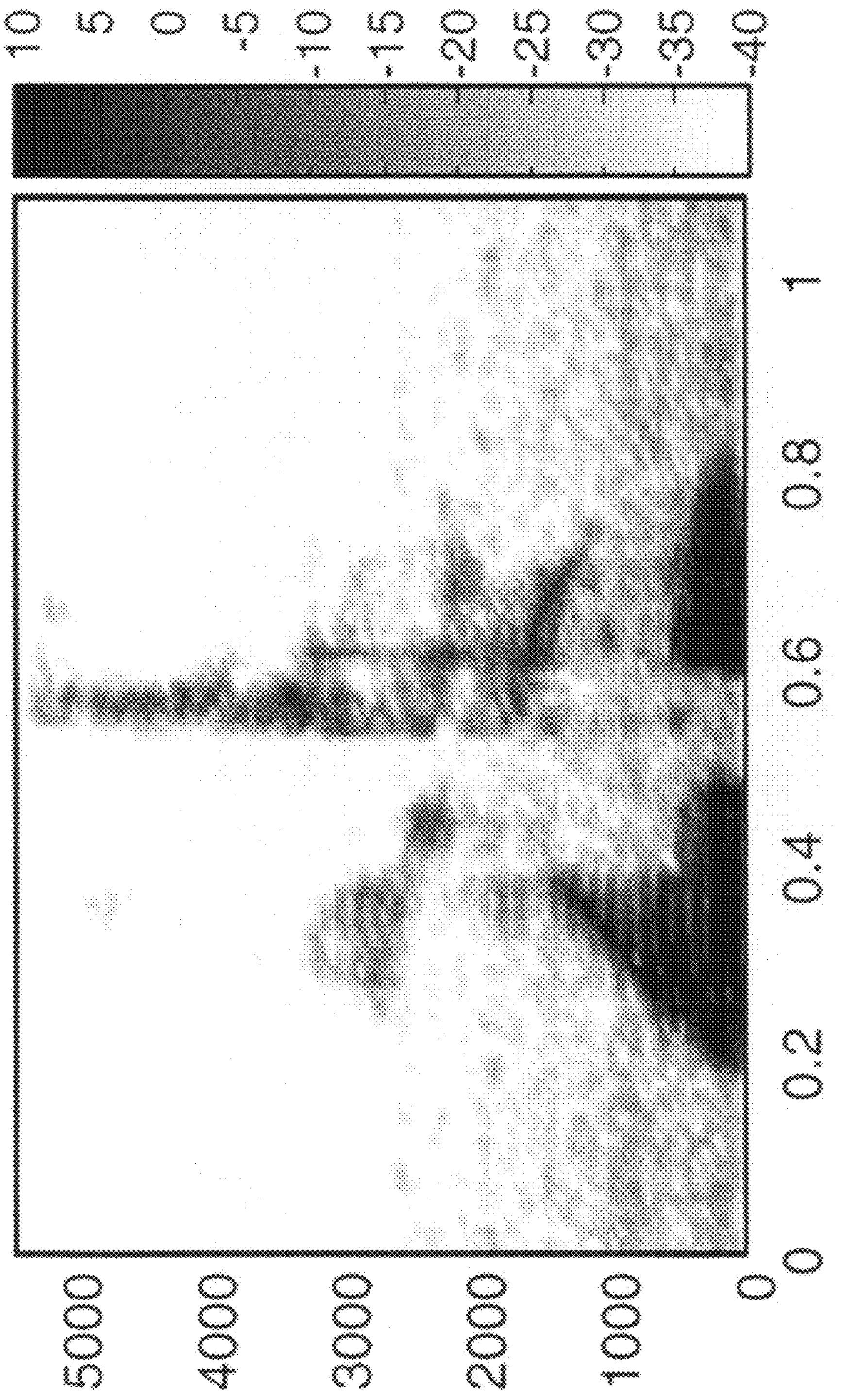
FIG. 3 is a spectrogram of an enhanced speech signal and a vehicle noise of medium intensity processed by a static noise suppression method.
Figure 4:
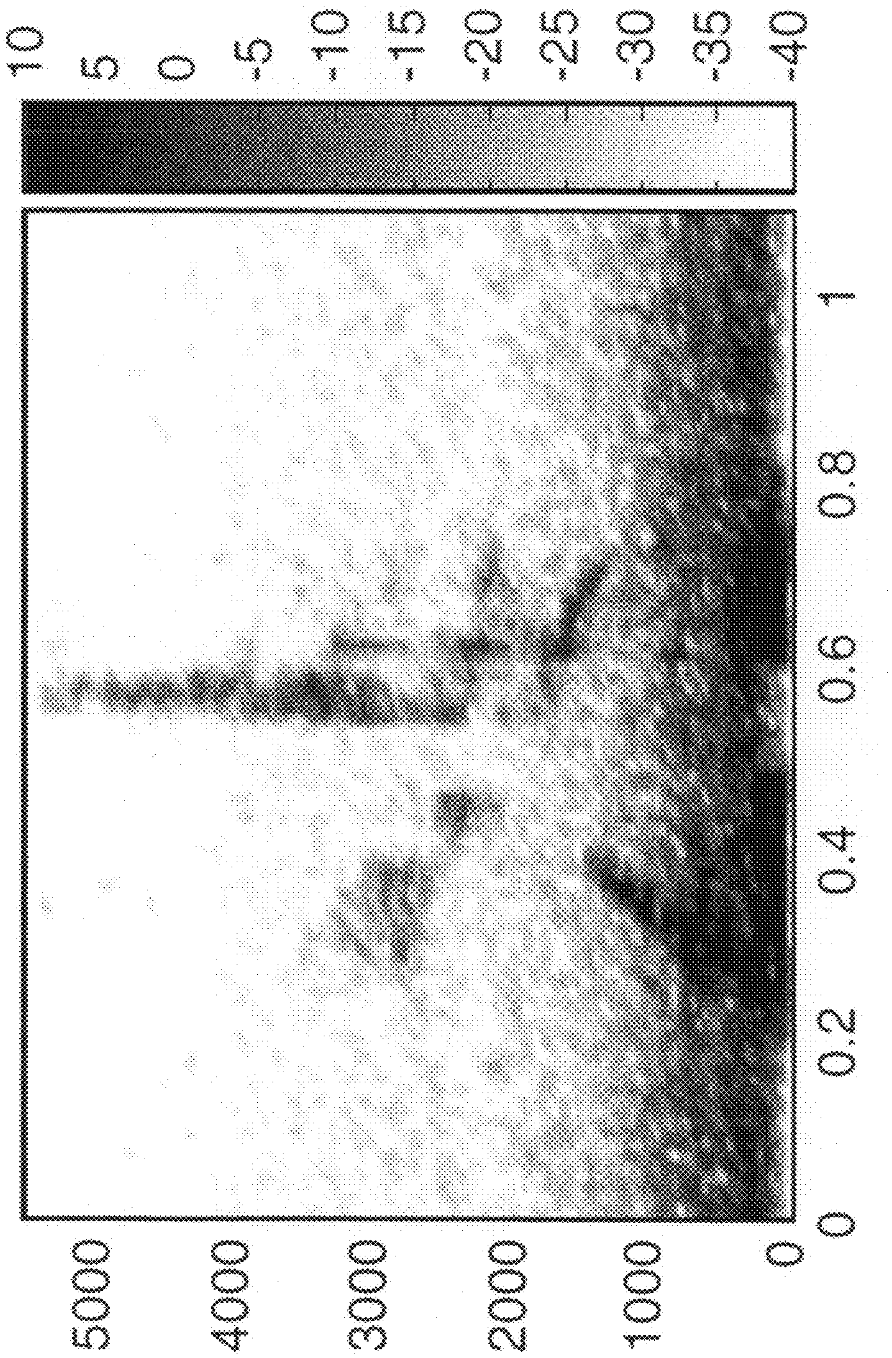
FIG. 4 is a spectrogram of an enhanced speech signal and a vehicle noise of high intensity processed by a static noise suppression method.

FIGS. 1 and 2 are spectrograms of speech signal recorded in medium and high level vehicle noise conditions, respectively. FIGS. 3 and 4 show the corresponding spectrograms of the speech signal shown in FIGS. 1 and 2 after speech is processed by a static noise suppression system. In FIGS. 1-4, the ordinate is measured in frequency and the abscissa is measured in time (e.g., seconds). As shown by the darkness of the plots, the static noise suppression system effectively suppresses medium (and low, not shown) levels of background noise (e.g., see FIG. 3). Conversely, some of speech appears corrupted or masked by residual noise when speech is recorded in a vehicle subject to intense noise (e.g., see FIG. 4).

Figure 5:
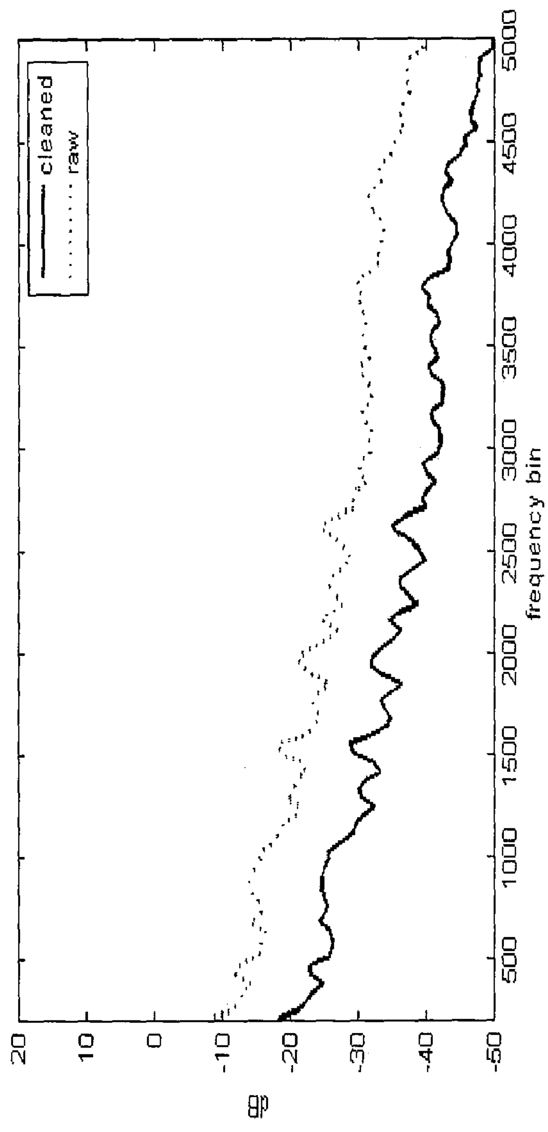
FIG. 5 are power spectral density graphs of a medium level background noise and a medium level background noise processed by a static noise suppression method.
Figure 6:
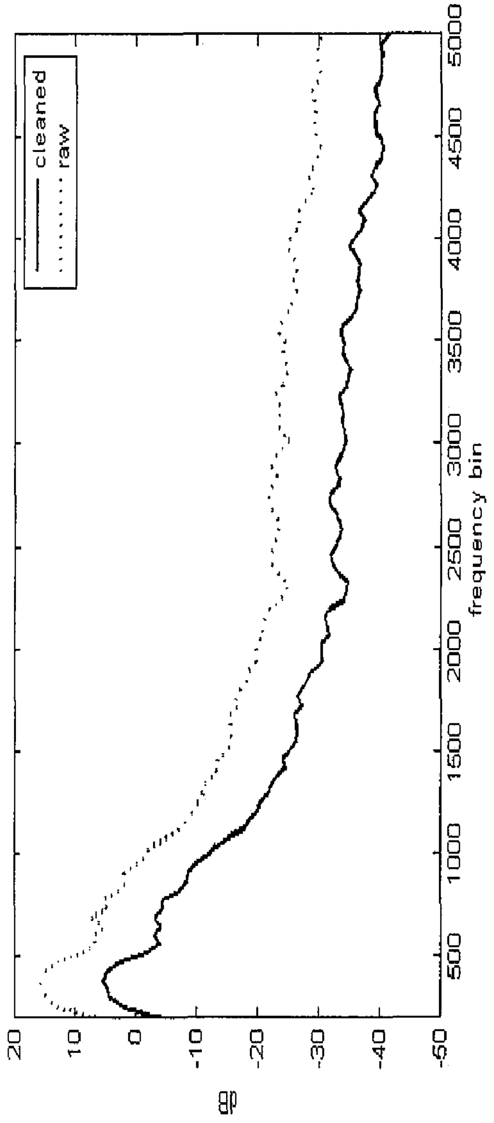
FIG. 6 are power spectral density graphs of a high level background noise and a high level background noise processed by a static noise suppression method.

Since some static noise suppression systems apply substantially the same amount of noise suppression across all frequencies, the noise shape may remain unchanged as speech is enhanced. FIGS. 5 and 6 are power spectral density graphs of a medium level or high level background noise and a medium level or high level background noise processed by a static noise suppression system. The exemplary static noise suppression system may not adapt attenuation to different noise types or noise conditions. In high noise conditions, such as those shown FIGS. 4 and 6, high levels of residual noise remain in the processed signal.

Figure 7:
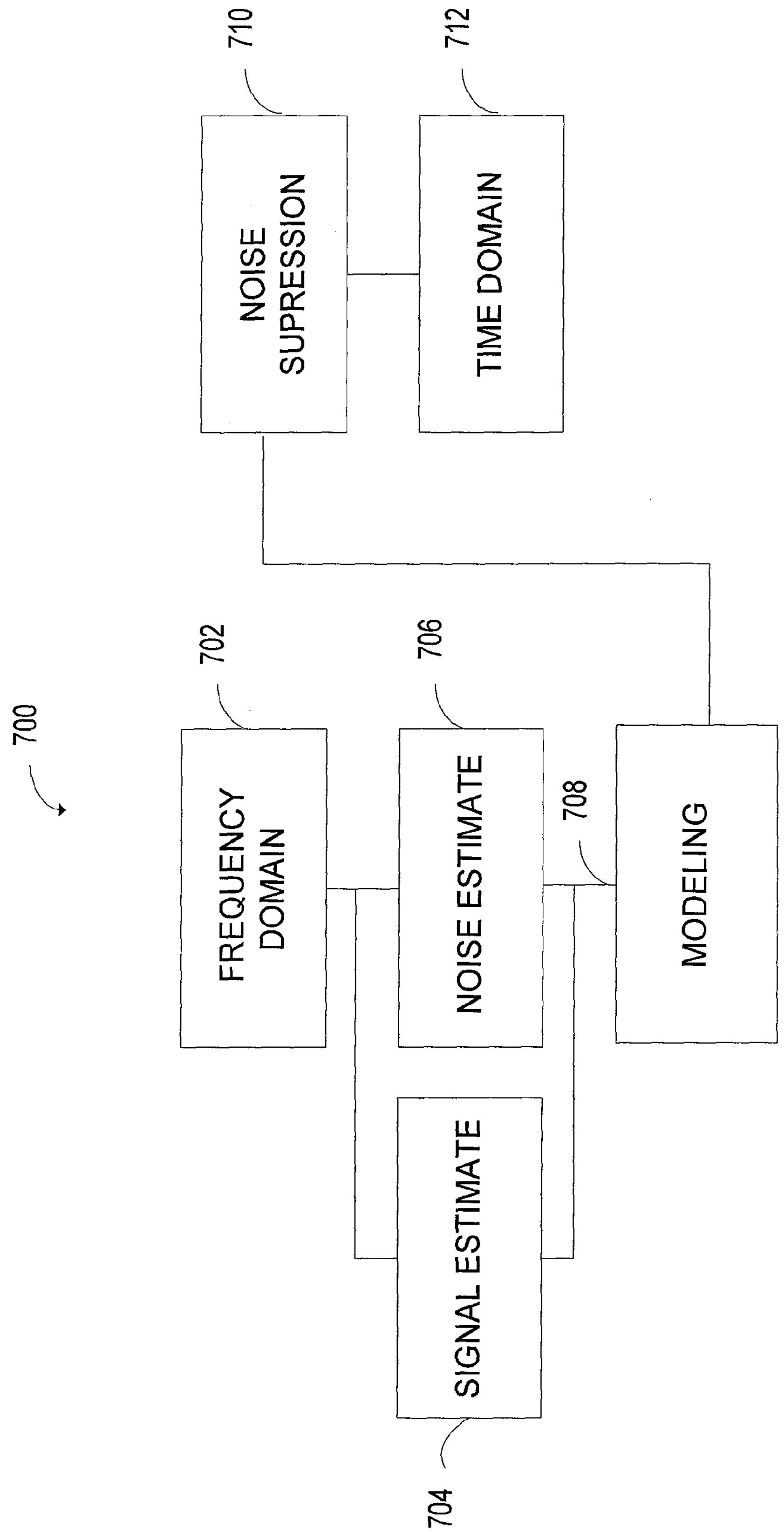
FIG. 7 is a flow diagram of a speech enhancement system.

FIG. 7 is a flow diagram of a real time or delayed speech enhancement method 700 that adapts to changing noise conditions. When a continuous signal is recorded it may be sampled at a predetermined sampling rate and digitized by an analog-to-digital converter (optional if received as a digital signal). The complex spectrum for the signal may be obtained by means of a Short-Time Fourier transform (STFT) that transforms the discrete-time signals into frequency bins, with each bin identifying a magnitude and a phase across a small frequency range at act 702.

At 704, signal power for each frequency bin is measured and the background noise is estimated at 706. The background noise estimate may comprise an average of the acoustic power in each frequency bin. To prevent biased background noise estimations during transients, the noise estimation process may be disabled during abnormal or unpredictable increases in detected power in an alternative method. A transient detection process may disable the background noise estimate when an instantaneous background noise exceeds a predetermined or an average background noise by more than a predetermined decibel level.

At 708, the background noise spectrum is modeled. The model may discriminate between a high and a low frequency range. When a linear model or substantially linear model are used, a steady or uniform suppression factor may be applied when a frequency bin is almost equal to or greater than a predetermined frequency bin. A modified or variable suppression factor may be applied when a frequency bin is less than a predetermined frequency bin. In some methods, the predetermined frequency bin may designate or approximate a division between a high frequency spectrum and a medium frequency spectrum (or between a high frequency range and a medium to low frequency range).

The suppression factors may be applied to the complex signal spectrum at 710. The processed spectrum may then be reconstructed or transformed into the time domain (if desired) at optional act 712. Some methods may reconstruct or transform the processed signal through a Short-time Inverse Fourier Transform (STIFT) or through an inverse sub-band filtering method.

Figure 8:
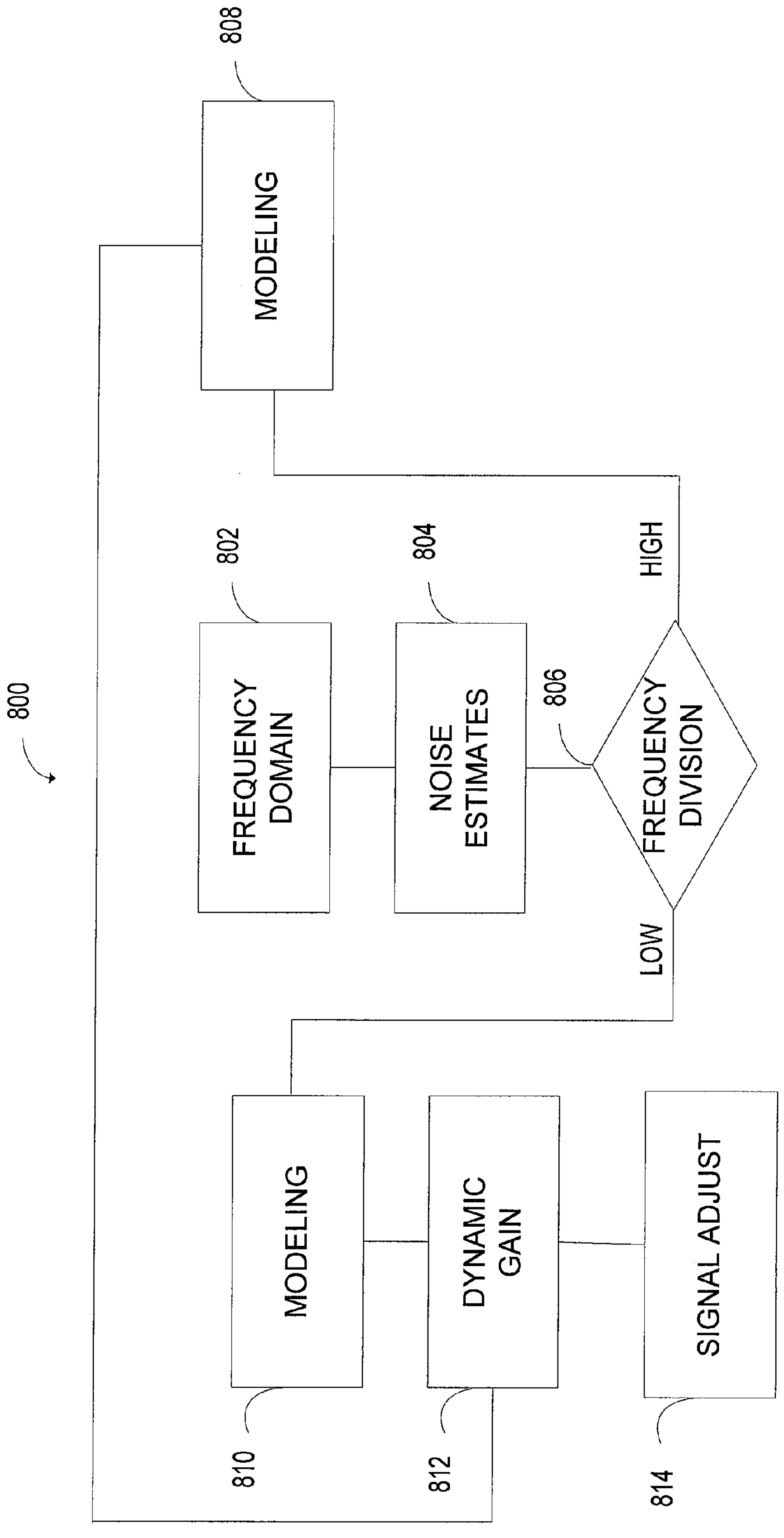
FIG. 8 is a second flow diagram of a speech enhancement system.

FIG. 8 is a flow diagram of an alternative real time or delayed speech enhancement method 800 that adapts to changing noise conditions in a vehicle. When a continuous signal is recorded it may be sampled at a predetermined sampling rate and digitized by an analog-to-digital converter (optional if received as a digital signal). The complex spectrum for the signal may be obtained by means of a Short-Time Fourier Transform (STFT) that transforms the discrete-time signals into frequency bins at act 802.

The power spectrum of the background noise may be estimated at an nth frame at 804. The background noise power spectrum of each frame $B_n$, may be converted into the dB domain as described by equation 4.

$$\phi_n=10\log_{10}B_n \tag{4}$$

The dB power spectrum may be divided into a low frequency portion and a high frequency portion at 806. The division may occur at a predetermined frequency $f_o$ such as a cutoff frequency, which may separate multiple linear regression models at 808 and 810. An exemplary process may apply two substantially linear models or the linear regression models described by equations 5 and 6.

$$Y_L=a_LX_L+b_L \tag{5}$$

$$Y_H=a_HX_H+b_H \tag{6}$$

In equations 5 and 6, X is the frequency, Y is the dB power of the background noise, $a_L$, $a_H$ are the slopes of the low and high frequency portion of the dB noise power spectrum, $b_L$, $b_H$ are the intercepts of the two lines when the frequency is set to zero.

A dynamic suppression factor for a given frequency below the predetermined frequency $f_o$ ($k_o$ bin) or the cutoff frequency may be described by equation 7.

$$\lambda(f) = \begin{cases} 10^{0.05*(b_H - b_L)-(f_o - f)/f_o}, & \text{if } b_H < b_L \\ 1, & \text{otherwise} \end{cases} \tag{7}$$

Alternatively, for each bin below the predetermined frequency or cutoff frequency bin $k_o$, a dynamic suppression factor may be described by equation 8.

$$\lambda(k) = \begin{cases} 10^{0.05*(b_H - b_L)*(k_n - k)/k_o}, & \text{if } b_H < b_L \\ 1, & \text{otherwise} \end{cases} \tag{8}$$

A dynamic adjustment factor or dynamic noise floor may be described by varying a uniform noise floor or threshold. The variability may be based on the relative position of a bin to the bin containing the predetermined bin as described by equation 9

$$\eta(k) = \begin{cases} \sigma * \lambda(k), & \text{when } k < k_o \\ \sigma, & \text{when } k \geq k_o \end{cases} \tag{9}$$

The speech enhancement method may minimize or maximize the spectral magnitude of a noisy speech segment by designating a dynamic adjustment $G_{dynamic,n,k}$ that designates short-time spectral suppression gains at the nth frame and the kth frequency bin at 812.

$$G_{dynamic,n,k} = \max(\eta(k), G_{n,k}) \tag{10}$$

The magnitude of the noisy speech spectrum may be processed by the dynamic gain $G_{dynamic,n,k}$ to clean the speech segments as described by equation 11 at 814.

$$|\hat{X}_{n,k}| = G_{dynamic,n,k} \cdot |Y_{n,k}| \tag{11}$$

In some speech enhancement methods the clean speech segments may be converted into the time domain (if desired). Some methods may reconstruct or transform the processed signal through a Short-Time Inverse Fourier Transform (STIFT); some methods may use an inverse sub-band filtering method, and some may use other methods.

In FIG. 8, the quality of the noise-reduced speech signal is improved. The amount of dynamic noise reduction may be determined by the difference in slope between the low and high frequency noise spectrums. When the low frequency portion (e.g., a first designated portion) of the noise power spectrum has a slope that is similar to a high frequency portion (e.g., a second designated portion), the dynamic noise floor may be substantially uniform or constant. When the negative slope of the low frequency portion (e.g., a first designated portion) of the noise spectrum is greater than that of the slope of the high frequency portion (e.g., a second designated portion), more aggressive or variable noise reduction methods may be applied at the lower frequencies. At higher frequencies a substantially uniform or constant noise flow may apply.

Figure 16:
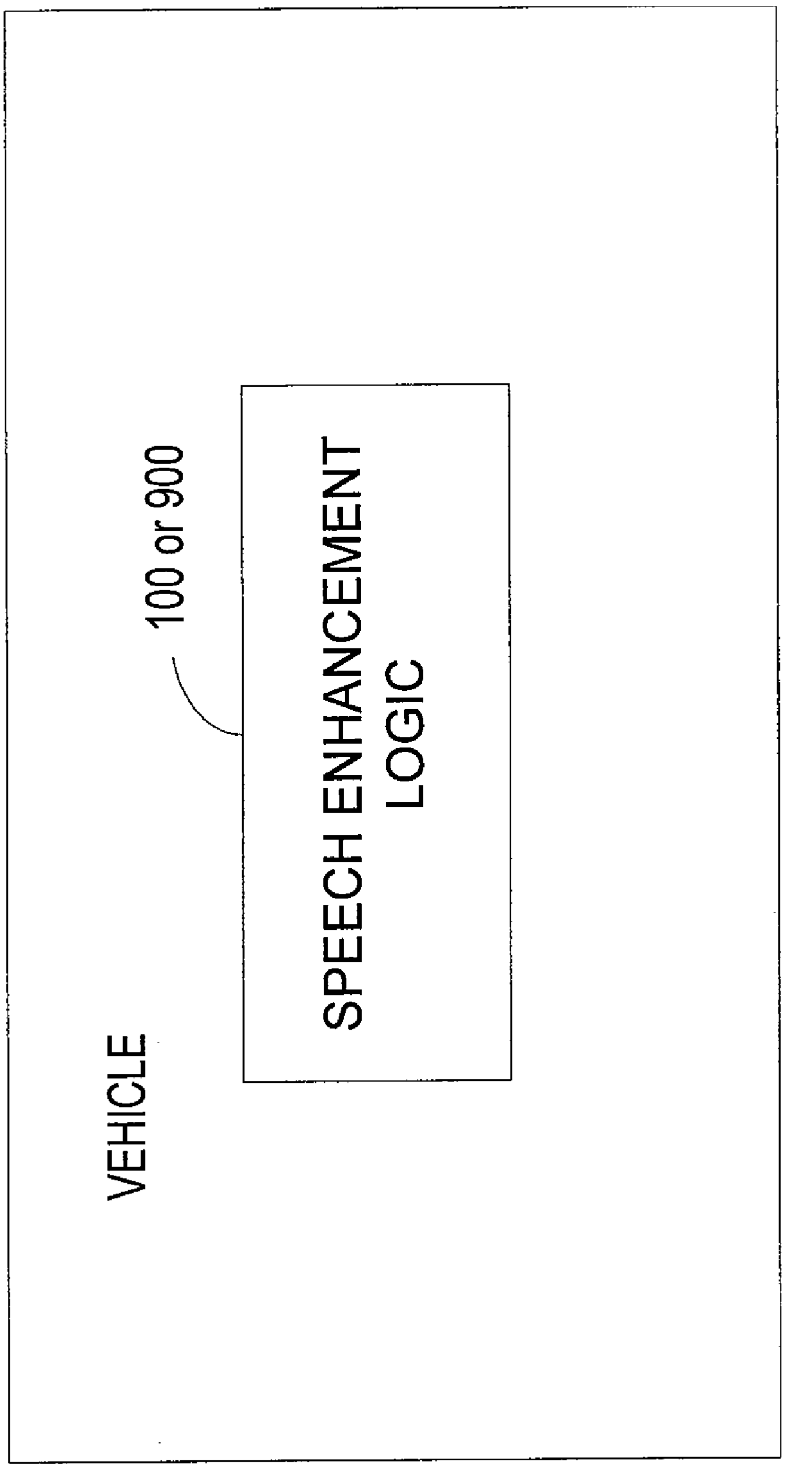
FIG. 16 is a speech enhancement system integrated within a vehicle.
Figure 17:
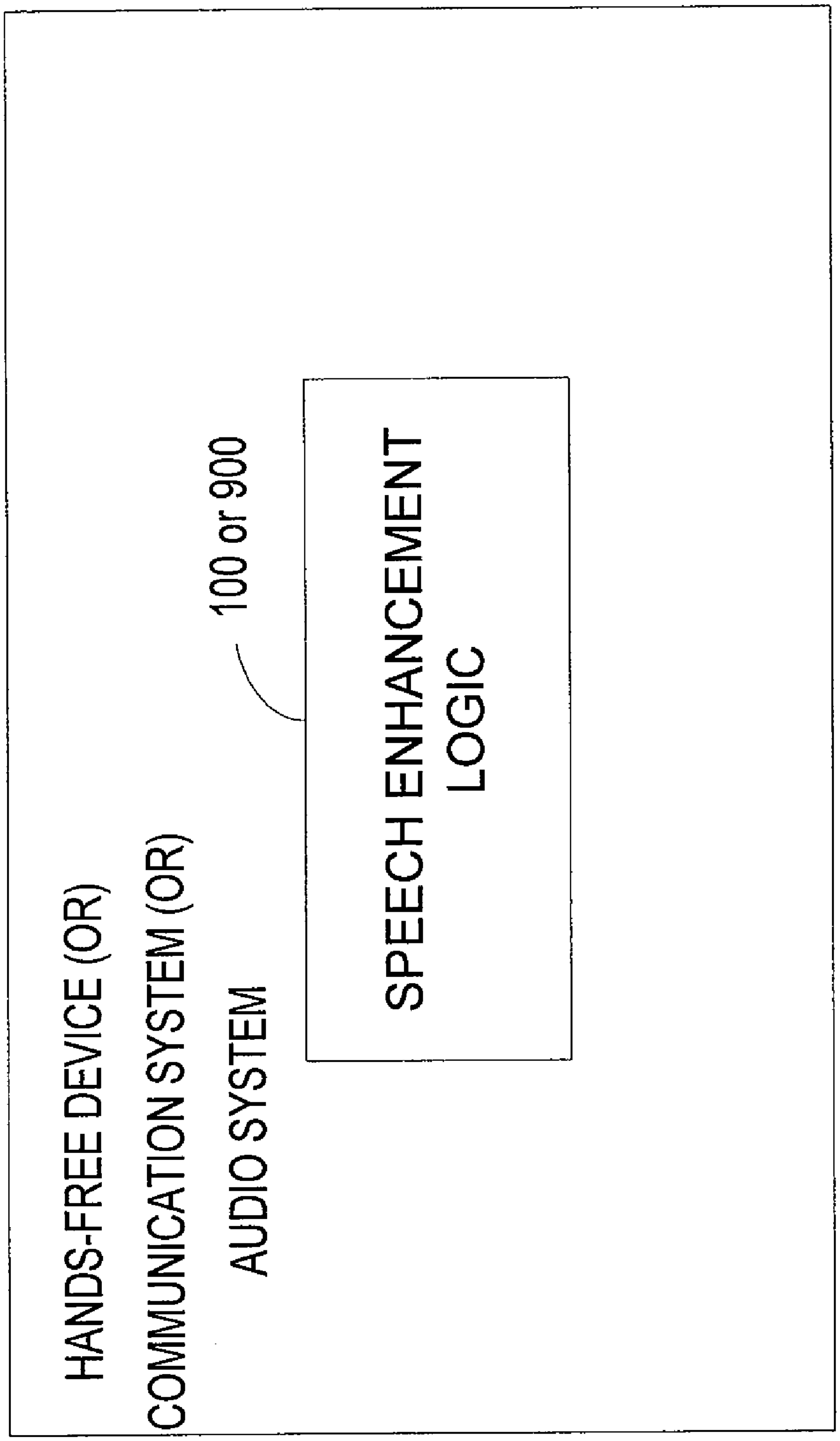
FIG. 17 is a speech enhancement system integrated within a hands-free communication device, a communication system, or an audio system.

The methods and descriptions of FIGS. 7 and 8 may be encoded in a signal bearing medium, a computer readable medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers, a wireless communication interface, a wireless system, an entertainment and/or comfort controller of a vehicle or types of non-volatile or volatile memory interfaced or resident to a speech enhancement system. The memory may include an ordered listing of executable instructions for implementing logical functions. A logical function may be implemented through digital circuitry, through source code, through analog circuitry, or through an analog source such through an analog electrical, or audio signals. The software may be embodied in any computer-readable medium or signal-bearing medium, for use by, or in connection with an instruction executable system, apparatus, device, resident to a hands-free system or communication system or audio system shown in FIG. 17 and also may be within a vehicle as shown in FIG. 16. Such a system may include a computer-based system, a processor-containing system, or another system that includes an input and output interface that may communicate with an automotive or wireless communication bus through any hardwired or wireless automotive communication protocol or other hardwired or wireless communication protocols.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Figure 9:
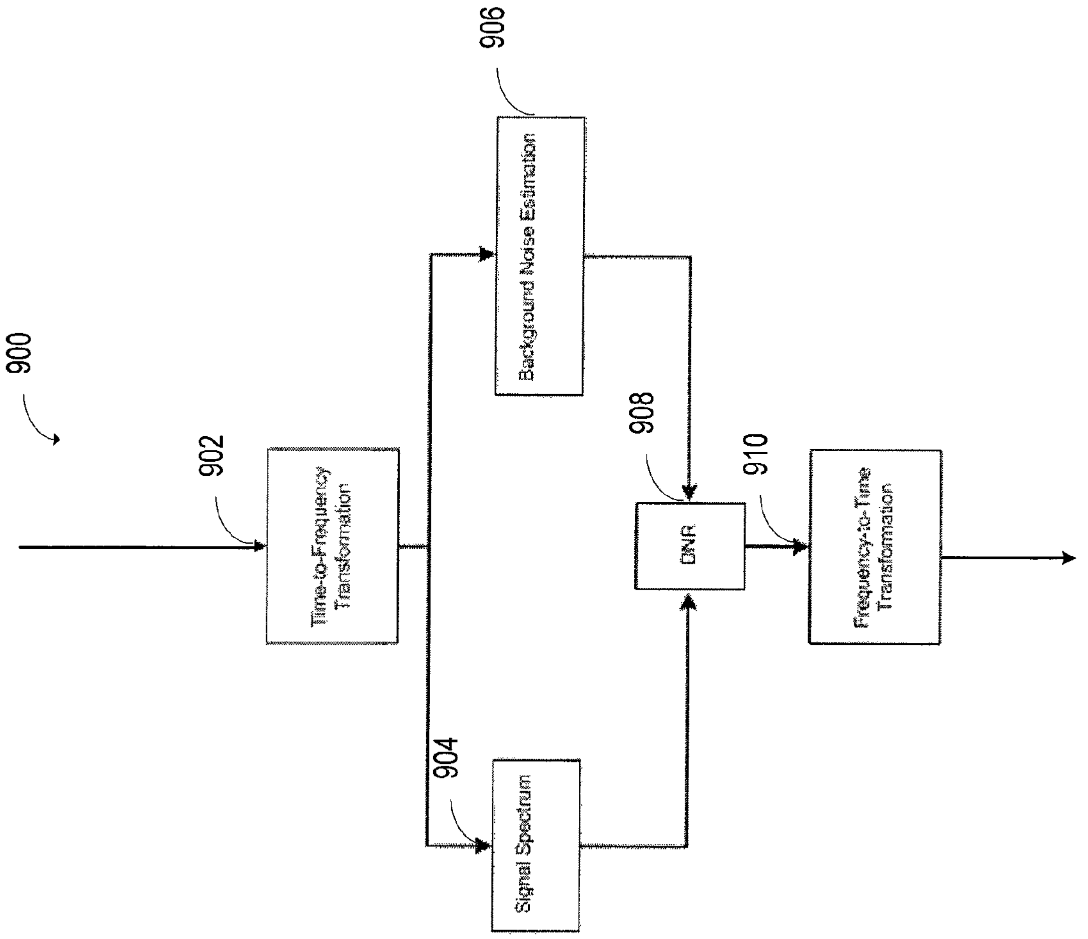
FIG. 9 is an exemplary dynamic noise reduction system.

FIG. 9 is a speech enhancement system 900 that adapts to changing noise conditions. When a continuous signal is recorded it may be sampled at a predetermined sampling rate and digitized by an analog-to-digital converter (optional device if the unmodified signal is received in a digital format). The complex spectrum of the signal may be obtained through a time-to-frequency transformer 902 that may comprise a Short-Time Fourier Transform (STFT) controller or a sub-band filter that separates the digitized signals into frequency bin or sub-bands.

The signal power for each frequency bin or sub-band may be measured through a signal detector 904 and the background noise may be estimated through a background noise estimator 906. The background noise estimator 906 may measures the continuous or ambient noise that occurs near a receiver. The background noise estimator 906 may comprise a power detector that averages the acoustic power in each or selected frequency bands when speech is not detected. To prevent biased noise estimations at transients, an alternative background noise estimator may communicate with an optional transient detector that disables the alternative background noise estimator during abnormal or unpredictable increases in power. A transient detector may disable an alternative background noise estimator when an instantaneous background noise B(f, i) exceeds an average background noise $B(f)_{Ave}$ by more than a selected decibel level 'c.' This relationship may be expressed by equation 12.

$$B(f,i)>B(f)_{Ave}+c \tag{12}$$

A dynamic background noise reduction controller 908 may dynamically model the background noise. The model may discriminate between two or more intervals of a frequency spectrum. When multiple models are used, for example when more than one substantially linear model is used, a steady or uniform suppression may be applied to the noisy signal when a frequency bin is almost equal or greater than a pre-designated bin or frequency. Alternatively, a modified or variable suppression factor may be applied when a frequency bin is less than a pre-designated frequency bin or frequency. In some systems, the predetermined frequency bin may designate or approximate a division between a high frequency spectrum and a medium frequency spectrum (or between a high frequency range and a medium to low frequency range) in an aural range.

Based on the model(s), the dynamic background noise reduction controller 908 may render speech to be more perceptually pleasing to a listener by aggressively attenuating noise that occurs in the low frequency spectrum. The processed spectrum may then be transformed into the time domain (if desired) through a frequency-to-time spectral converter 910. Some frequency-to-time spectral converters 910 reconstruct or transform the processed signal through a Short-Time Inverse Fourier Transform (STIFT) controller or through an inverse sub-band filter.

Figure 10:
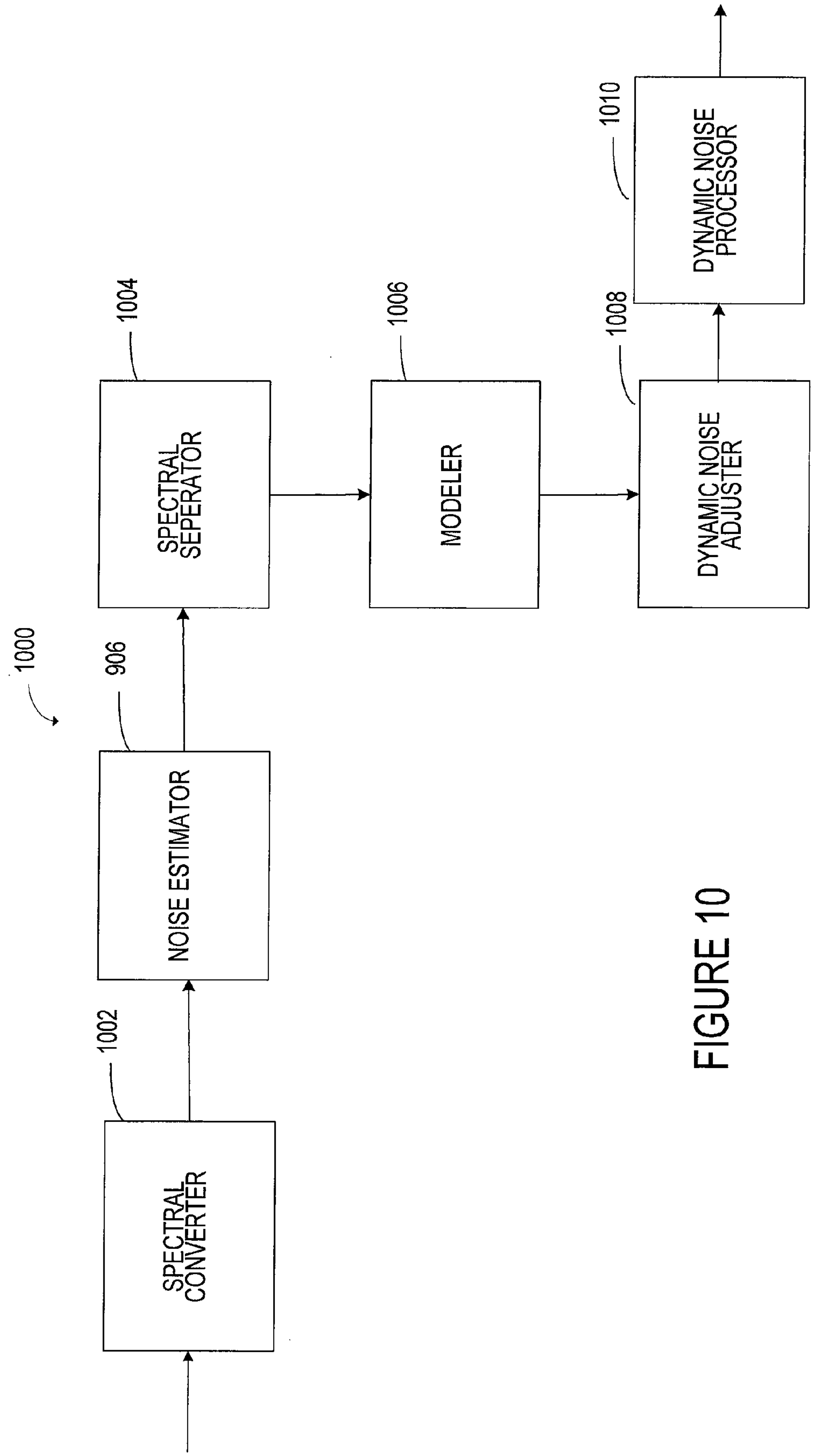
FIG. 10 is an alternative exemplary dynamic noise reduction system.

FIG. 10 is an alternative speech enhancement system 1000 that may improve the perceptual quality of the processed speech. The systems may benefit from the human auditory system's characteristics that render speech to be more perceptually pleasing to the ear by not aggressively suppressing noise that is effectively inaudible. The system may instead focus on the more audible frequency ranges. The speech enhancement may be accomplished by a spectral converter 1002 that digitizes and converts a time-domain signal to the frequency domain, which is then converted into the power domain. A background noise estimator 906 measures the continuous or ambient noise that occurs near a receiver. The background noise estimator 906 may comprise a power detector that averages the acoustic power in each frequency bin when little or no speech is detected. To prevent biased noise estimations during transients, a transient detector may disables the background noise estimator 906 during abnormal or unpredictable increases in power in some alternative speech enhancement systems.

A spectral separator 1004 may divide the power spectrum into a low frequency portion and a high frequency portion. The division may occur at a predetermined frequency such as a cutoff frequency, or a designated frequency bin.

To determine the required noise suppression, a modeler 1006 may fit separate lines to selected portions of the noisy speech spectrum. For example, a modeler 1006 may fit a line to a portion of the low and/or medium frequency spectrum and may fit a separate line to a portion of the high frequency portion of the spectrum. Through a regression, a best-fit line may model the severity of the vehicle noise in the multiple portions of the spectrum.

A dynamic noise adjuster 1008 may mark the spectral magnitude of a noisy speech segment by designating a dynamic adjustment factor to short-time spectral suppression gains at each or selected frames and each or selected kth frequency bins. The dynamic adjustment factor may comprise a perceptual nonlinear weighting of a gain factor in some systems. A dynamic noise processor 1010 may then attenuate some of the noise in a spectrum.

Figure 11:
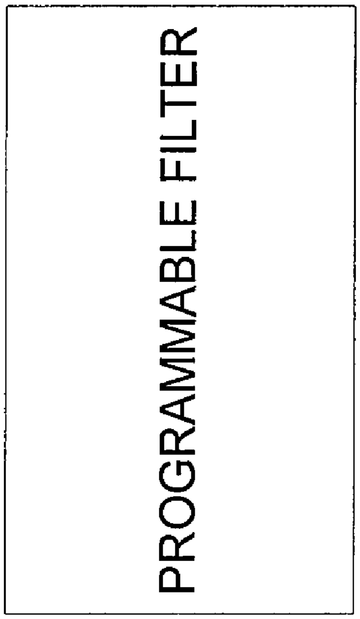
FIG. 11 is a filter programmed with a dynamic noise reduction logic.

FIG. 11 is a programmable filter that may be programmed with a dynamic noise reduction logic or software encompassing the methods described. The programmable filter may have a frequency response based on the signal-to-noise ratio of the received signal, such as a recursive Wiener filter. The suppression gain of an exemplary Wiener filter may be described by equation 13.

$$G_{n,k}=\frac{\hat{SNR}_{priori_{n,k}}}{\hat{SNR}_{priori_{n,k}}+1}. \tag{13}$$

$\hat{SNR}_{priori_{n,k}}$ is the a priori SNR estimate described by equation 14.

$$\hat{SNR}_{priori_{n,k}}=G_{n-1,k}\hat{SNR}_{post_{n,k}}-1. \tag{14}$$

The $\hat{SNR}_{post_{n,k}}$ is the a posteriori SNR estimate described by equation 15.

$$\hat{SNR}_{post_{n,k}}=\frac{|Y_{n,k}|^2}{|\hat{D}_{n,k}|^2}. \tag{15}$$

Here $|\hat{D}_{n,k}|$ is the noise magnitude estimates. $|Y_{n,k}|$ is the short-time spectral magnitudes of noisy speech, The suppression gain of the filter may include a dynamic noise floor described by equation 10 to estimate a gain factor:

$$G_{dynamic,n,k}=\max(\eta(k),G_{n,k}) \tag{10}$$

A uniform or constant floor may also be used to limit the recursion and reduce speech distortion as described by equation 16.

$$\hat{SNR}_{priori_{n,k}}=\mathrm{MAX}(G_{dynamic,n-1,k},\sigma)\hat{SNR}_{post_{n,k}}-1 \tag{16}$$

To minimize the musical tone noise, the filter is programmed to smooth the $\hat{SNR}_{post_{n,k}}$ as described by equation 17.

$$\hat{SNR}_{post_{n,k}}=\frac{\beta|\hat{Y}_{n-1,k}|^2+(1-\beta)|Y_{n,k}|^2}{|\hat{D}_{n,k}|^2} \tag{17}$$

where β may be a factor between about 0 to about 1.

Figure 12:
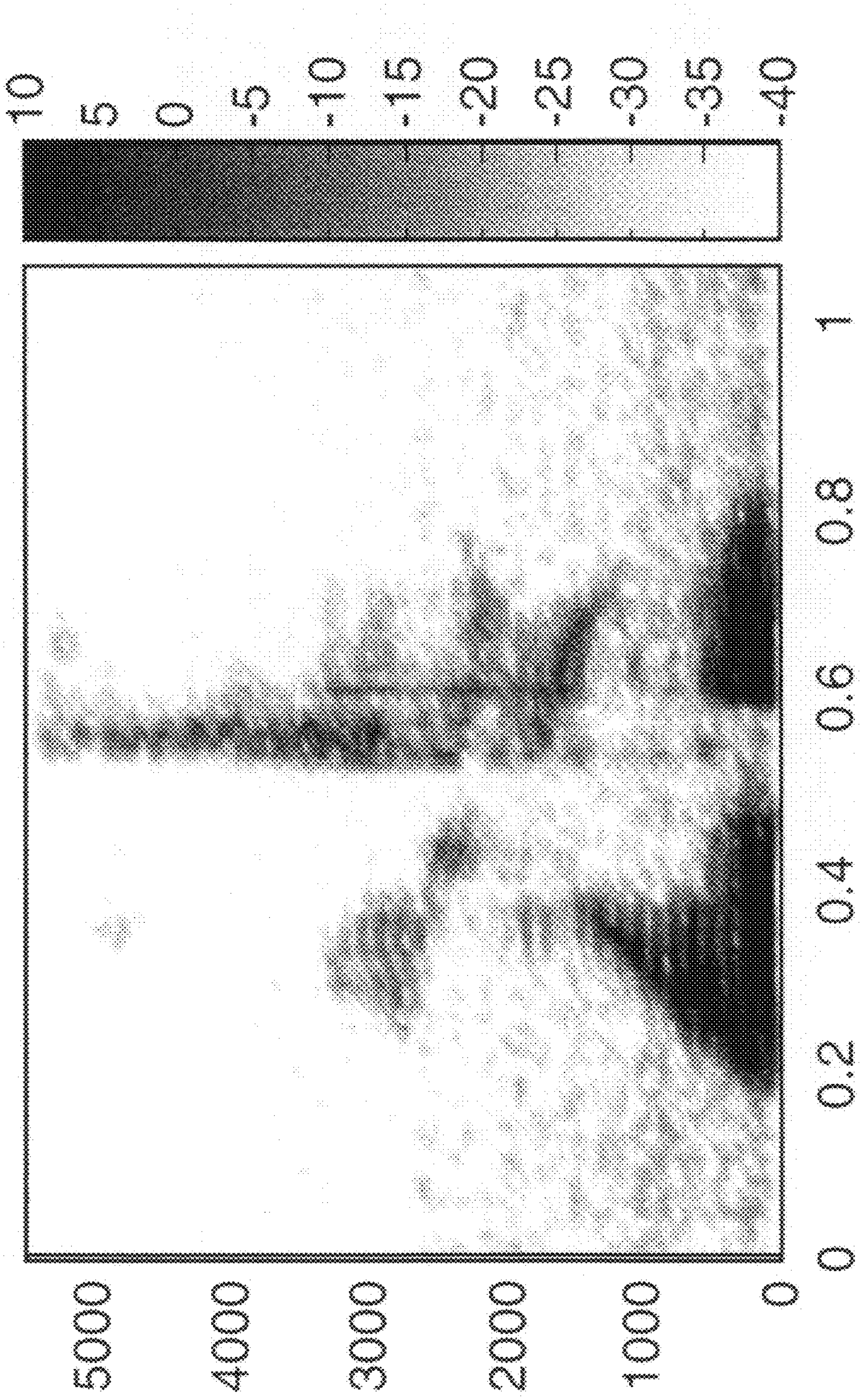
FIG. 12 is a spectrogram of a speech signal enhanced with dynamic noise reduction that attenuates vehicle noise of medium intensity.
Figure 13:
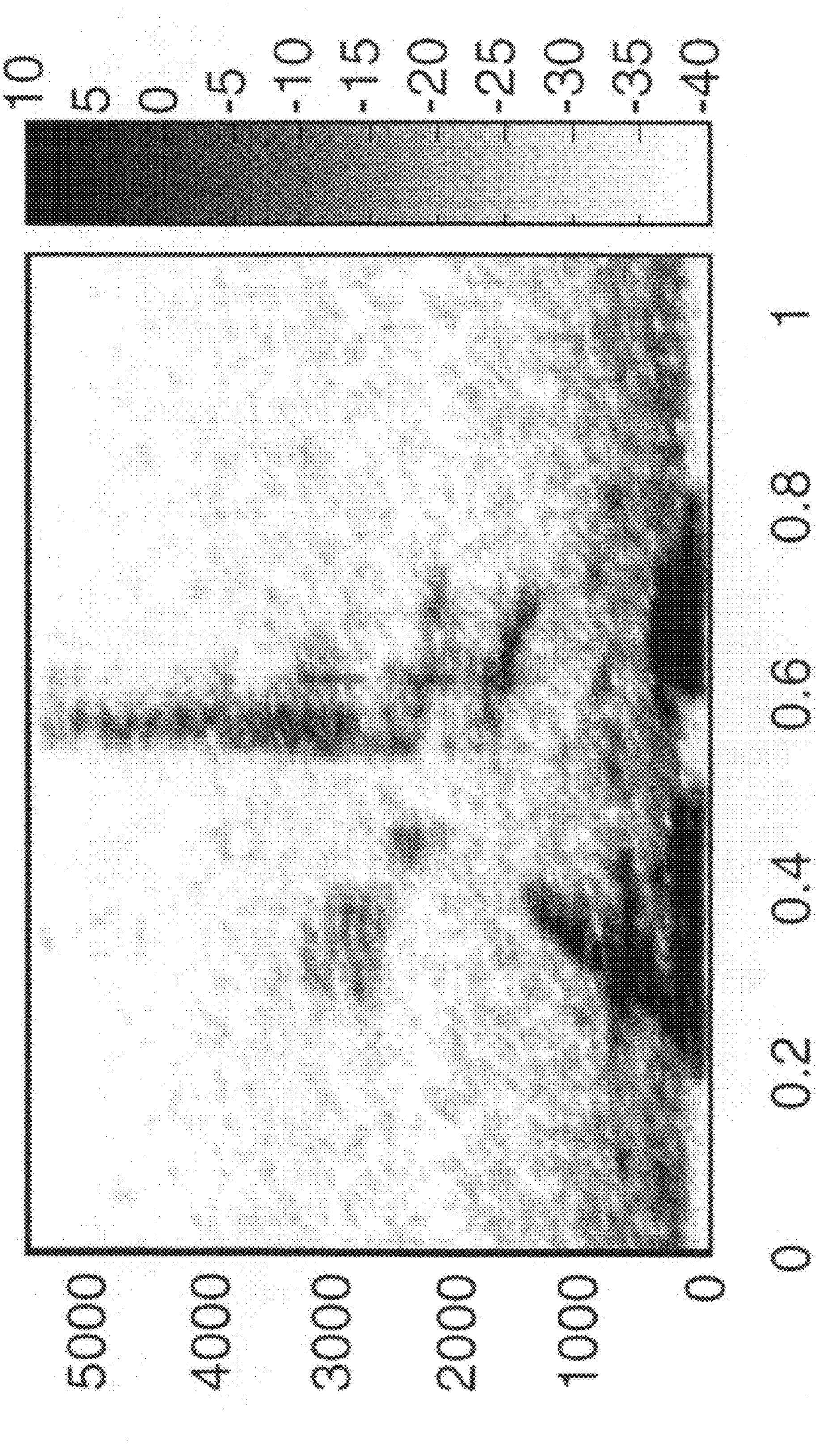
FIG. 13 is a spectrogram of a speech signal enhanced with dynamic noise reduction that attenuates vehicle noise of high intensity.

FIGS. 12 and 13 show spectrograms of speech signals enhanced with the dynamic noise reduction. The dynamic noise reduction attenuates vehicle noise of medium intensity (e.g., compare to FIG. 1) to generate the speech signal shown in FIG. 12. The dynamic noise reduction attenuates vehicle noise of high intensity (e.g., compare to FIG. 2) to generate the speech signal shown in FIG. 13.

Figure 14:
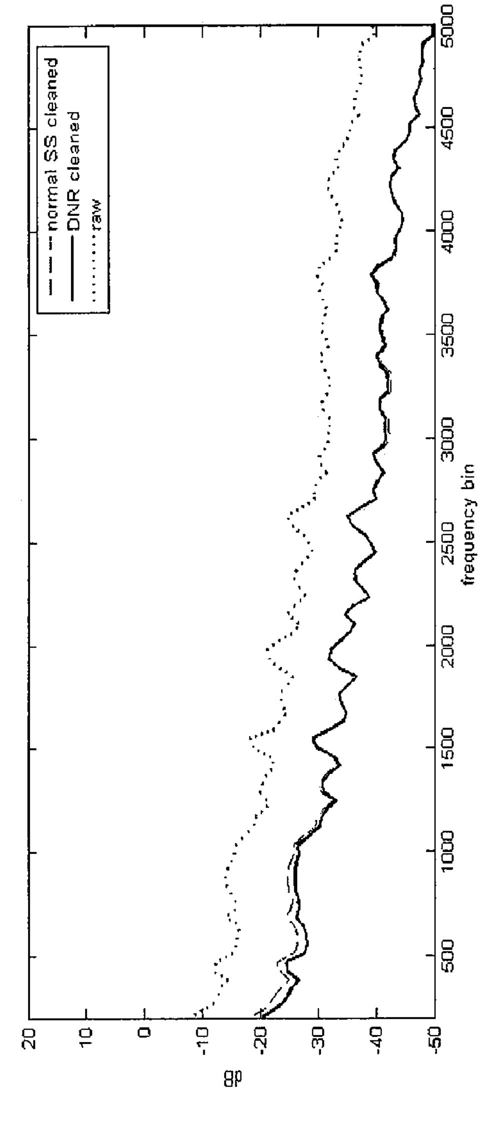
FIG. 14 are power spectral density graphs of a medium level background noise, a medium level background noise processed by a static noise suppression method, and a medium level background noise processed by a dynamic noise suppression method.
Figure 15:
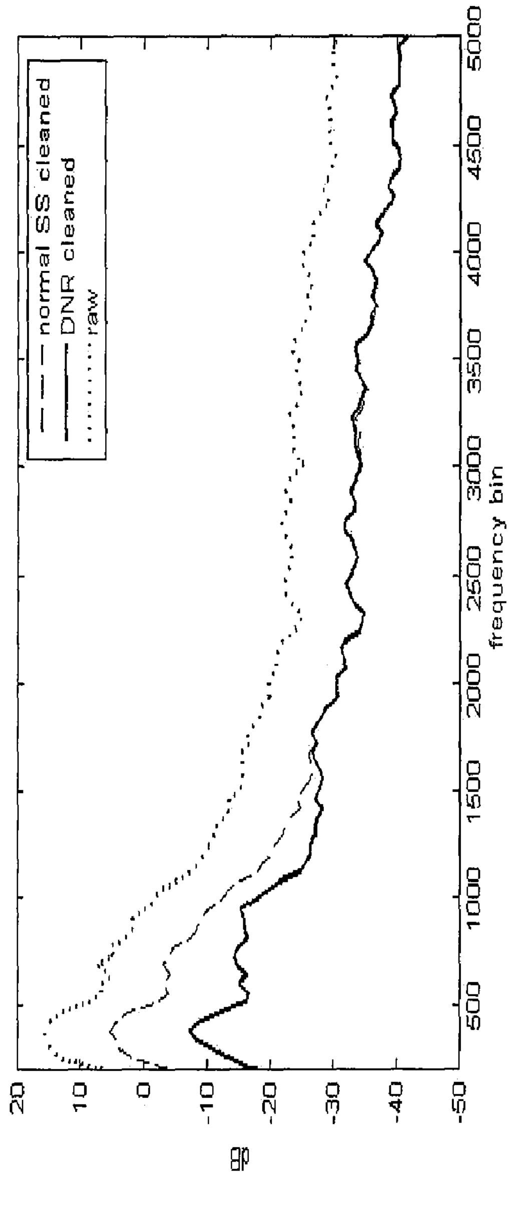
FIG. 15 are power spectral density graphs of a high level background noise, a high level background noise processed by a static suppression, and a high level background noise processed by a dynamic noise suppression method.

FIG. 14 are power spectral density graphs of a medium level background noise, a medium level background noise processed by a static suppression system, and a medium level background noise processed by a dynamic noise suppression system. FIG. 15 are power spectral density graphs of a high level background noise, a high level background noise processed by a static suppression system, and a high level background noise processed by a dynamic noise suppression system. These figures shown how at lower frequencies the dynamic noise suppression systems produce a lower noise floor than the noise floor produced by some static suppression systems.

The speech enhancement system improves speech intelligibility and/or speech quality. The gain adjustments may be made in real-time (or after a delay depending on an application or desired result) based on signals received from an input device such as a vehicle microphone. The system may interface additional compensation devices and may communicate with system that suppresses specific noises, such as for example, wind noise from a voiced or unvoiced signal such as the system described in U.S. patent application Ser. No. 10/688,802, entitled "System for Suppressing Wind Noise" filed on Oct. 16, 2003, which is incorporated by reference.

The system may dynamically control the attenuation gain applied to signal detected in an enclosure or an automobile communication device such as a hands-free system. In an alternative system, the signal power may be measured by a power processor and the background nose measured or estimated by a background noise processor. Based on the output of the background noise processor multiple linear relationships of the background noise may be modeled by the dynamic noise reduction processor. The noise suppression gain may be rendered by a controller, an amplifier, or a programmable filter. The devices may have a low latency and low computational complexity.

Other alternative speech enhancement systems include combinations of the structure and functions described above or shown in each of the Figures. These speech enhancement systems are formed from any combination of structure and function described above or illustrated within the Figures. The logic may be implemented in software or hardware. The hardware may include a processor or a controller having volatile and/or non-volatile memory that interfaces peripheral devices through a wireless or a hardwire medium. In a high noise or a low noise condition, the spectrum of the original signal may be adjusted so that intelligibility and signal quality is improved.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system that improves speech quality comprising:

a spectral converter that is configured to digitize and convert a time varying signal into the frequency domain;

a background noise estimator configured to measure a background noise that is present in the time varying signal detected by a receiver;

a spectral separator in communication with the spectral converter and the background noise estimator that is configured to divide a power spectrum of a speech segment;

a modeler in communication with the spectral separator that fits a plurality of substantially linear functions to differing portions of the speech segment, where the modeler is configured to fit a first line of the plurality of substantially linear functions to a first frequency portion of the speech spectrum and a second line of the plurality of substantially linear functions to a second frequency portion of the speech spectrum;

a dynamic noise adjuster programmed to designate the spectral magnitude of a noisy portion of the speech segment by designating a dynamic adjustment factor that corresponds to the noisy portion of the speech segment, where the dynamic noise adjuster is programmed to calculate a difference in slope between the first line and the second line, and calculate the dynamic adjustment factor based on the difference in slope; and a dynamic noise processor programmed to attenuate a portion of the noise detected in one or more portions of the speech segment based on the dynamic adjustment factor.

2. The system that improves speech quality of claim 1 where the modeler is configured to approximate a plurality of linear relationships.

3. The system that improves speech quality of claim 2 where the first frequency portion comprises a medium to low frequency portion of an aural spectrum below a predetermined frequency and the second frequency portion comprises a high frequency portion of the aural spectrum above the predetermined frequency.

4. A speech enhancement system that adapts to changing noise conditions heard in a vehicle, comprising:

a time-to-frequency converter that converts portions of a first speech segment into frequency bands;

a signal detector configured to measure a signal power of the frequency bands of the first speech segment;

a background noise estimator configured to measure an aural background noise detected within a vehicle; and a dynamic noise reduction controller configured to dynamically model the aural background noise in the vehicle to render an attenuated speech segment through a dynamic attenuation of a portion of the noise that occurs in a low frequency portion of the spectrum of the first speech segment below a predetermined frequency;

where the dynamic noise reduction controller is configured to fit a first line to the low frequency portion of the spectrum of the first speech segment, fit a second line to a high frequency portion of the spectrum of the first speech segment above the predetermined frequency, calculate a difference in slope between the first line and the second line, and calculate an attenuation amount for the dynamic attenuation based on the difference in slope.

5. The speech enhancement system of claim 4 further comprising an analog-to-digital converter configured to convert the analog speech segment into a digital signal.

6. The speech enhancement system of claim 5 where the time-to-frequency converter comprises a Short-Time-Fourier-Transform controller.

7. The speech enhancement system of claim 6 where the background noise estimator comprises a power detector configured to average acoustic power in each of the frequency bands.

8. The speech enhancement system of claim 7 further comprising a transient detector configured to disable the background noise estimator when the measured background noise exceeds a predetermined threshold.

9. The speech enhancement system of claim 8 where the dynamic noise reduction controller is configured to discriminate between two or more intervals of a frequency spectrum.

10. The speech enhancement system of claim 8 where the dynamic noise reduction controller is programmed to attenuate a portion of the noise that occurs in a portion of the spectrum of a speech segment.

11. The speech enhancement system of claim 8 where the dynamic noise reduction controller is configured to apply a substantially uniform suppression when a frequency of the speech segment is substantially equal to or greater than the predetermined frequency.

12. The speech enhancement system of claim 11 where the dynamic noise reduction controller is configured to apply a variable suppression to a frequency bin of the speech segment when the frequency bin is less than the predetermined frequency.

13. The speech enhancement system of claim 8 further comprising a wind suppression system in communication with the dynamic noise reduction controller that suppresses the noise generated by moving air.

14. A system that dynamically controls the attenuation gain applied to a signal recorded in a vehicle, comprising:

a power processor configured to measure the signal power in a sound segment in real-time;

a background noise processor configured to measure the background noise detected in the sound segment in real-time;

a dynamic noise reduction processor configured to model the measured background noise by processing multiple linear relationships; and a dynamic noise suppression filter having a noise suppression gain adjusted in response to the model of the measured background noise;

where the dynamic noise reduction processor is configured to fit a first line to a first frequency portion of the sound segment, fit a second line to a second frequency portion of the sound segment, calculate a difference in slope between the first line and the second line, and calculate the noise suppression gain based on the difference in slope.

15. A system that dynamically controls the attenuation gain applied to a signal of claim 14, where the first frequency portion comprises a low frequency portion of the sound segment below a predetermined frequency.

16. A system that dynamically controls the attenuation gain applied to a signal of claim 15, where the second frequency portion comprises a high frequency portion of the sound segment above the predetermined frequency.

17. A method that improves speech quality and intelligibility of a speech segment, comprising:

converting a sound segment into separate frequency bands where each band identifies an amplitude and a phase;

estimating the background noise of a signal by averaging the acoustic power measured in each frequency band;

discriminating between a high portion of the frequency spectrum above a predetermined frequency and a low portion of the frequency spectrum below the predetermined frequency;

fitting a first line to the low portion of the frequency spectrum;

fitting a second line to the high portion of the frequency spectrum;

calculating a difference in slope between the first line and the second line;

modeling a background noise spectrum by determining a substantially constant attenuation to be applied to the high frequency portion of the spectrum and a variable attenuation to be applied to the low portion of the frequency spectrum;

calculating a level for the variable attenuation based on the difference in slope; and attenuating portions of the background noise from the sound segment by applying the constant attenuation and the variable attenuation.

18. The method that improves speech quality and intelligibility of a speech segment of claim 17 further comprising designating a predetermined frequency band that designates the separation between the high portion of the frequency spectrum and the low portion of the frequency spectrum.

19. The method that improves speech quality of a speech segment of claim 17 further comprising disabling the act of estimating the background noise when a transient noise is detected.

20. The method that improves speech quality of a speech segment of claim 17 further comprising converting the sound segment into the power domain.

21. The method that improves speech quality of a speech segment of claim 17 where the level of variable attenuation is based on a plurality of modeled line coordinate intercepts.

22. A non-transitory computer readable medium that retains software that improves a speech quality by modeling a background noise comprising:

a computer readable medium that retains a signal estimation logic, a modeling logic, and an attenuation logic that is accessible to and configured to be processed by a processor, where the signal estimation logic determines the signal power of a desired signal within an input signal;

the modeling logic represents a plurality of background noises detected from the input signal through a plurality of substantially linear models, where the modeling logic fits a first line of the plurality of substantially linear models to a first frequency portion of the input signal, and fits a second line of the plurality of substantially linear models to a second frequency portion of the input signal; and the attenuation logic approximates the level of suppression to be applied to the input signal in response to an output of the modeling logic, where the attenuation logic calculates a difference in slope between the first line and the second line, and calculates the level of suppression based on the difference in slope.

23. The computer readable medium of claim 22 further comprising a memory programmed to retain the plurality of substantially linear models.

* * * * *